United States
Fleischman

[11] 4,076,390
[45] Feb. 28, 1978

[54] OBJECTIVE FOR OPTICAL SYSTEM

[75] Inventor: Andor A. Fleischman, Northbrook, Ill.

[73] Assignee: Bell & Howell Company, Chicago, Ill.

[21] Appl. No.: 748,353

[22] Filed: Dec. 7, 1976

[51] Int. Cl.² .............................. G02B 9/60; G02B 1/00
[52] U.S. Cl. ...................................... 350/216; 350/176
[58] Field of Search ............................. 350/216, 176

[56] References Cited
U.S. PATENT DOCUMENTS

| | | | |
|---|---|---|---|
| 3,795,437 | 3/1974 | Sugiyama | 350/176 X |
| 3,926,504 | 12/1975 | Fleischman | 350/216 |

Primary Examiner—Paul A. Sacher
Attorney, Agent, or Firm—John E. Peele, Jr.; Aaron Passman; Roger M. Fitz-Gerald

[57] ABSTRACT

This invention relates to an objective optical sub-system having fewer elements and improved performance specifications as compared to an objective it will replace.

1 Claim, 9 Drawing Figures

F/1.40
F/2.00

18.69°
13.46°

OBJECTIVE FOR OPTICAL SYSTEM

The present invention relates to an objective for an improved optical system, which objective meets and exceeds specifications for performance requirements of similar objectives of prior art multiple sub-system optical systems. Particularly, the objective is lighter in weight and easier to manufacture in comparison with the objective of the optical system which it will replace.

In certain classes of optical systems, selected sub-systems are combined to form the complete optical system. In this example, for imaging a scene under low light conditions, an objective receives the light from the scene and images the light onto a receiver or receiving relay sub-system intermediate the objective and an eyepiece sub-system. Except for such modifications as necessary to enable the relay and eyepiece optical systems to perform optimally with the objective, these sub-systems are assumed to be unchanged.

In comparison with a larger, heavier, eight element optical system, this objective optical system is designed with fewer elements which elements are easier to manufacture under mass production circumstances, and require less critical element-to-element spacing. Thus, the objective is easier to fabricate and offers a significant cost advantage over the existing objective. This new optical design further meets and exceeds the performance requirements of the earlier objective.

Other objects and advantages of the invention will become apparent from the detailed description which follows when taken in conjunction with the accompanying drawings.

Figure 1:
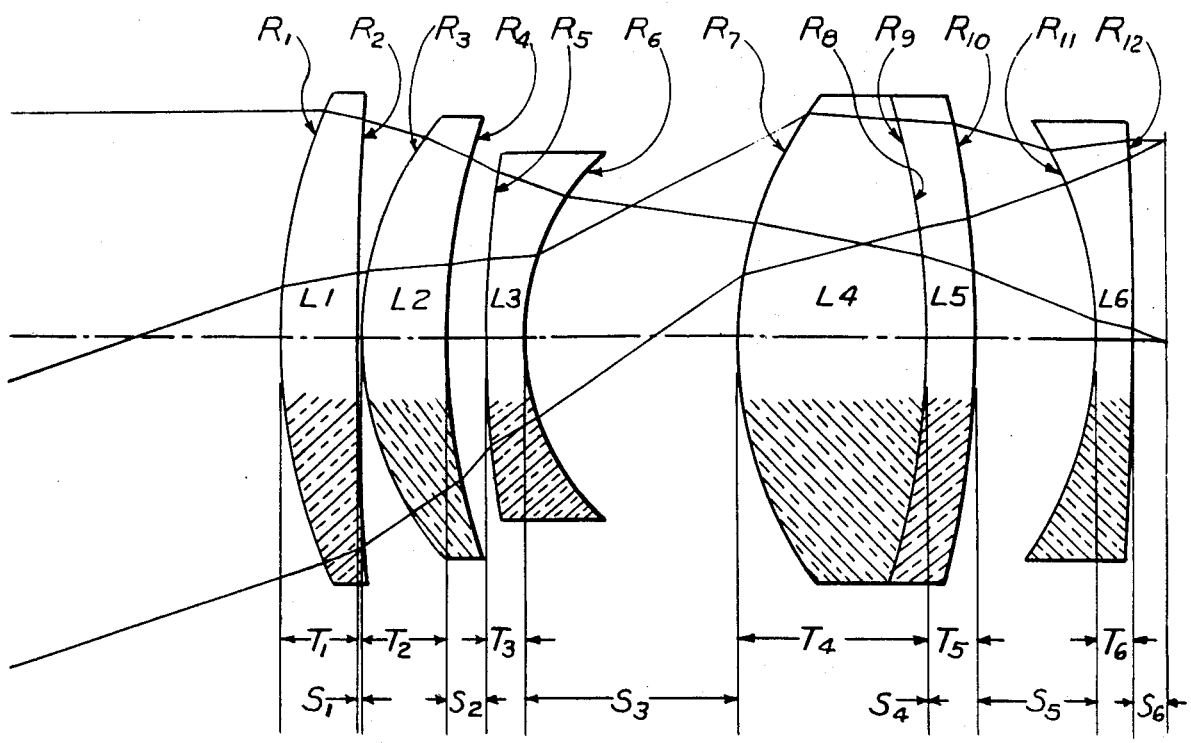
FIG. 1 is a diagrammatic sectional view of an optical system embodying the present invention.

In this preferred embodiment as shown in the drawings, the objective is a six element, five component construction resulting in a high speed design with a large effective aperture of $f/1.4$. The effective focal length is 26.60mm (1.0471 inches). In the optical system as shown, the light rays enter from a scene to the left, and are imaged to the right on an image plane which may be either a light receiver such as a light intensifier or a focal plane on which an eyepiece is focused for visual evaluation of the subject matter in the scene.

The objective of FIG. 1 includes a first element $L_1$, starting at the ray entrance side of the optical system. This meniscus element is of positive power, and converges the light rays slightly toward a positive meniscus second element $L_2$ which substantially engages the first element along a dispersive internal contact surface. The light rays from the second element are further converged upon exiting the element.

A third element $L_3$, air spaced from element $L_2$, is a negative meniscus singlet which receives the light rays and further converges the same upon exiting from this element.

Spaced apart from element $L_3$ is a component comprised of elements $L_4$ and $L_5$ which are respectively a relatively thick, positive element of double convex configuration, and a relatively thin concavo-convex meniscus diverging element. This component collects the light rays exiting element $L_3$ and directs the same to a sixth element $L_6$. This latter element is a negative, concavo-convex element which performs with the other elements as a field flattener and relays the light rays to the image plane. As a field flattener, the flatness of field is improved without introducing other aberrations, which would usually require additional elements for comparable aberration corrections. Light rays impinging on the image plane may impinge on either a light receiver such as the face of a light intensifier or a focal plane of an eyepiece through which the image may be visualized.

A preferred example of the objective forming a particular embodiment of the invention is constructed in conformity with the optical values as set forth below. Dimensions are in inches, and the refractive indices for the Sodium D line and the Abbe dispersion numbers are respectively designated at $N_D$ and $V$.

TABLE 1

EFL = 1.0471 inches (26.60mm)
Half Angle of Field = 18.69 degrees

| Lens | Radii | | Thickness | Spacing | $N_D$ | V |
|---|---|---|---|---|---|---|
| $L_1$ | $R_1 =$ | 1.0150 | | | | |
| | | | $T_1 = .1300$ | | 1.734 | 51.7 |
| | $R_2 =$ | −7.3470 | | | | |
| | | | | $S_1 = .0050$ | | |
| $L_2$ | $R_3 =$ | 0.5507 | | | | |
| | | | $T_2 = .1420$ | | 1.734 | 51.7 |
| | $R_4 =$ | −1.1810 | | | | |
| | | | | $S_2 = .0680$ | | |
| $L_3$ | $R_5 =$ | 2.4000 | | | | |
| | | | $T_3 = .0600$ | | 1.805 | 25.4 |
| | $R_6 =$ | −0.4085 | | | | |
| | | | | $S_3 = .3690$ | | |
| $L_4$ | $R_7 =$ | 0.7000 | | | | |
| | | | $T_4 = .3260$ | | 1.734 | 51.7 |
| | $R_8 =$ | 1.0700 | | | | |
| | | | | $S_4 = $ —0— | | |
| $L_5$ | $R_9 =$ | −1.0700 | | | | |
| | | | $T_5 = .0800$ | | 1.805 | 25.4 |
| | $R_{10} =$ | 1.3100 | | | | |
| | | | | $S_5 = .2050$ | | |
| $L_6$ | $R_{11} =$ | −0.5800 | | | | |
| | | | $T_6 = .0600$ | | 1.805 | 25.4 |
| | $R_{12} =$ | 3.9260 | | | | |
| | | | | $S_6 = .0491$ | | |

In the above table, the first column lists the lens elements numerically starting at the ray entrance side of the system. The second column lists the radii for the respective surfaces of the elements with the positive values of the radii indicating surfaces which are convex and the negative (−) values of the radii indicating surfaces which are concave. The third column lists the thickness of the respective elements. The fourth column lists the axial spacings between the respective elements. The fifth and sixth columns list respectively the refractive index and the dispersive index of the elements. The "Half Angle of Field" is the angle between the continuation of the lens axis and a line from the nodal point of the lens to the most oblique point image on the image plane.

Figure 2A:
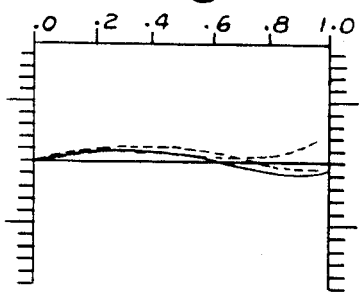
FIGS. 2A to 2H are graphical representations of the various aberrations of the lens system shown in FIG. 1 and having the design data given in Table 1.
Figure 2B:
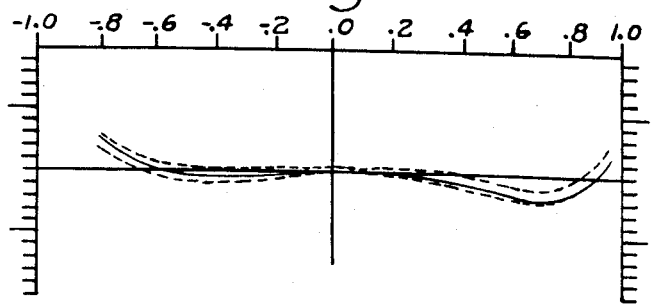
Figure 2C:
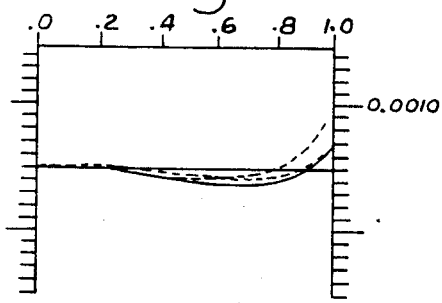
Figure 2D:
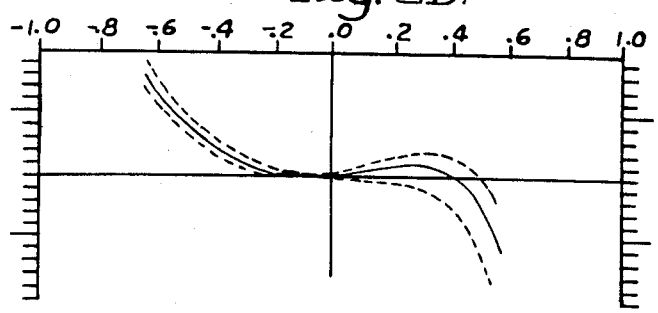
Figure 2E:
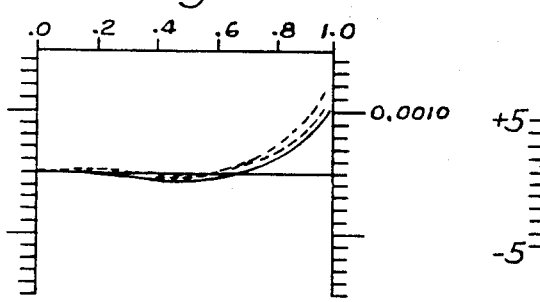
Figure 2F:
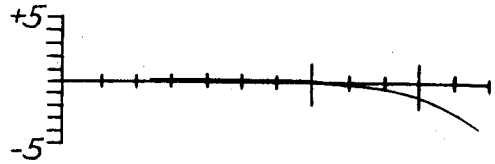
Figure 2G:
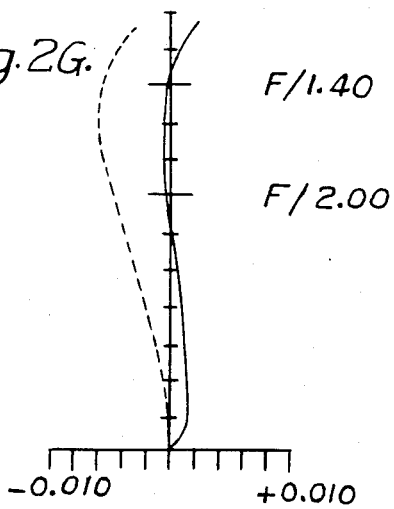
Figure 2H:
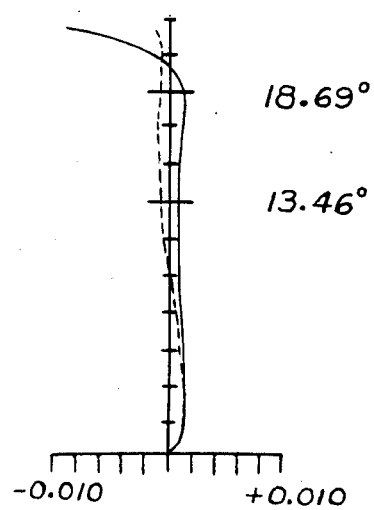

FIGS. 2A to 2H graphically represent the various aberrations of the optical system shown in FIG. 1 and having the design data set forth in Table 1. FIG. 2A represents the transverse spherical aberration for three typical wavelengths for an axial ray bundle. FIGS. 2B and 2C represent the transverse tangential and radial aberrations respectively for an off axis bundle corresponding to 0.7 of the maximum format covered by the lens. FIGS. 2D and 2E represent the transverse tangential and radial aberrations respectively for an off axis bundle corresponding to the maximum format covered by the lens. FIG. 2F represents radial distortion as a percentage deviation from a "perfect" image. FIG. 2G represents the longitudinal spherical aberration by a solid line and the offense-against-sine condition by the dotted line. FIG. 2H represents the astigmatism with tangential and sagittal field curvature shown in solid and dashed lines respectively.

In summary, an improved objective optical sub-system is described as having fewer and easier to manufacture elements and meeting or exceeding performance specifications of prior art systems, such as a bigger, heavier, more expensive eight element system.

What is claimed is:

1. An objective sub-system of an optical system having a large effective aperture and having substantially the following specification:

TABLE 1

| Lens | Radii | Thickness | Spacing | $N_D$ | V |
|---|---|---|---|---|---|
| | \multicolumn{5}{l}{EFL = 1.0471 inches (26.60mm)} |
| | \multicolumn{5}{l}{Half Angle of Field = 18.69 degrees} |
| $L_1$ | $R_1 = 1.0150$ | | | | |
| | | $T_1 = .1300$ | | 1.734 | 51.7 |
| | $R_2 = -7.3470$ | | | | |
| | | | $S_1 = .0050$ | | |
| $L_2$ | $R_3 = 0.5507$ | | | | |
| | | $T_2 = .1420$ | | 1.734 | 51.7 |

TABLE 1-continued

| Lens | Radii | Thickness | Spacing | $N_D$ | V |
|---|---|---|---|---|---|
| | \multicolumn{5}{l}{EFL = 1.0471 inches (26.60mm)} |
| | \multicolumn{5}{l}{Half Angle of Field = 18.69 degrees} |
| | $R_4 = -1.1810$ | | | | |
| | | | $S_2 = .0680$ | | |
| $L_3$ | $R_5 = 2.4000$ | | | | |
| | | $T_3 = .0600$ | | 1.805 | 25.4 |
| | $R_6 = -0.4085$ | | | | |
| | | | $S_3 = .3690$ | | |
| $L_4$ | $R_7 = 0.7000$ | | | | |
| | | $T_4 = .3260$ | | 1.734 | 51.7 |
| | $R_8 = 1.0700$ | | | | |
| | | | $S_4 = —0—$ | | |
| $L_5$ | $R_9 = -1.0700$ | | | | |
| | | $T_5 = .0800$ | | 1.805 | 25.4 |
| | $R_{10} = 1.3100$ | | | | |
| | | | $S_5 = .2050$ | | |
| $L_6$ | $R_{11} = -0.5800$ | | | | |
| | | $T_6 = .0600$ | | 1.805 | 25.4 |
| | $R_{12} = 3.9260$ | | | | |
| | | | $S_6 = .0491$ | | | wherein the first column lists the lens elements numerically starting at the ray entrance side of the system; the second column lists the respective radii; the third column lists the thickness of the respective elements; the fourth column lists the axial spacings between the respective elements; the fifth column lists the refractive index of the elements; and the sixth column lists the dispersive index of the elements.

* * * * *